(12) United States Patent
Sakhnini et al.

(10) Patent No.: US 11,558,882 B2
(45) Date of Patent: Jan. 17, 2023

(54) TECHNIQUES FOR COMMUNICATING REPETITIONS OF CONTROL CHANNELS IN WIRELESS COMMUNICATIONS

(71) Applicant: QUALCOMM Incorporated, San Diego, CA (US)

(72) Inventors: Iyab Issam Sakhnini, San Diego, CA (US); Qiang Wu, San Diego, CA (US); Tao Luo, San Diego, CA (US); Mahmoud Taherzadeh Boroujeni, San Diego, CA (US); Jing Sun, San Diego, CA (US); Xiaoxia Zhang, San Diego, CA (US); Wooseok Nam, San Diego, CA (US); Mostafa Khoshnevisan, San Diego, CA (US); Jun Ma, San Diego, CA (US); Peter Gaal, San Diego, CA (US); Juan Montojo, San Diego, CA (US); Mehmet Izzet Gurelli, San Diego, CA (US); Ahmed Abdelaziz Ibrahim Abdelaziz Zewail, San Diego, CA (US)

(73) Assignee: QUALCOMM INCORPORATED

( * ) Notice: Subject to any disclaimer, the term of this patent is extended or adjusted under 35 U.S.C. 154(b) by 30 days.

(21) Appl. No.: 17/222,192

(22) Filed: Apr. 5, 2021

(65) Prior Publication Data
US 2021/0321429 A1 Oct. 14, 2021

Related U.S. Application Data

(60) Provisional application No. 63/007,164, filed on Apr. 8, 2020.

(51) Int. Cl.
*H04W 72/12* (2009.01)
*H04W 80/02* (2009.01)

(52) U.S. Cl.
CPC ......... *H04W 72/1257* (2013.01); *H04W 72/1273* (2013.01); *H04W 72/1289* (2013.01); *H04W 80/02* (2013.01)

(58) Field of Classification Search
CPC ......... H04W 72/1257; H04W 72/1273; H04W 72/1289; H04W 80/02; H04W 72/042;
(Continued)

(56) References Cited

U.S. PATENT DOCUMENTS

2020/0008235 A1* 1/2020 Sarkis ............... H04L 5/0007
2020/0100223 A1* 3/2020 Park .................. H04L 5/10
(Continued)

FOREIGN PATENT DOCUMENTS

WO 2020064512 A1 4/2020

OTHER PUBLICATIONS

International Search Report and Written Opinion—PCT/US2021/026031—ISA/EPO—dated Jun. 18, 2021.

*Primary Examiner* — Afshawn M Towfighi
(74) *Attorney, Agent, or Firm* — Arent Fox, LLP

(57) ABSTRACT

Aspects described herein relate to receiving, from a base station, a downlink communication indicating resources scheduled for one or more repetitions of a downlink control channel, receiving, from the base station, the one or more repetitions of the downlink control channel, and combining the one or more repetitions of the downlink control channel to decode the downlink control channel. In another aspect, the network can transmit, to a user equipment (UE), a downlink communication indicating resources scheduled for one or more repetitions of a downlink control channel, and transmitting, to the UE, the one or more repetitions of the downlink control channel over the resources.

30 Claims, 7 Drawing Sheets

(58) Field of Classification Search
CPC ....... H04L 1/0046; H04L 1/0072; H04L 1/08; H04L 5/0094; H04L 5/0053; H04L 5/0051
See application file for complete search history.

(56) References Cited

U.S. PATENT DOCUMENTS

2020/0106559 A1* 4/2020 Vilaipornsawai ..... H04L 5/0023
2020/0314881 A1* 10/2020 Bagheri ............ H04W 72/1273

* cited by examiner

TECHNIQUES FOR COMMUNICATING REPETITIONS OF CONTROL CHANNELS IN WIRELESS COMMUNICATIONS

CLAIM OF PRIORITY UNDER 35 U.S.C. § 119

The present application for patent claims priority to Provisional Patent Application No. 63/007,164, entitled "TECHNIQUES FOR COMMUNICATING REPETITIONS OF CONTROL CHANNELS IN WIRELESS COMMUNICATIONS" filed Apr. 8, 2020, which is assigned to the assignee hereof and hereby expressly incorporated by reference herein for all purposes.

BACKGROUND

Aspects of the present disclosure relate generally to wireless communication systems, and more particularly, to control channel communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can receive downlink control channel communications from a base station, which can include information for communicating with the base station for wireless network access. In 5G NR, the base station can configure a control resource set (CORESET) using higher layer signaling (e.g., radio resource control (RRC) signaling) to define resources over which the base station transmits the downlink control channel communications. UEs can determine the CORESET based on the signaling and can accordingly monitor the resources defined by the CORESET for downlink control channel communications from the base station. More specifically, within a CORESET, one or more search spaces indicating resources over which the downlink control channel may be transmitted can be defined. The UE can determine the one or more search spaces of the CORESET and can accordingly monitor the associated resources for downlink control channel communications from the base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes receiving, from a base station, a downlink communication indicating one or more dynamically scheduled control resource sets (CORESETs) over which one or more repetitions of a downlink control channel are scheduled, receiving, from the base station, the one or more repetitions of the downlink control channel over the one or more dynamically scheduled CORESETs, and combining the one or more repetitions of the downlink control channel to decode the downlink control channel.

In another example, a method for wireless communication is provided. The method includes transmitting, to a user equipment (UE), a downlink communication indicating one or more dynamically scheduled CORESETs over which one or more repetitions of a downlink control channel are scheduled, and transmitting, to the UE, the one or more repetitions of the downlink control channel over the one or more dynamically scheduled CORESETs.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In one specific example, an apparatus for wireless communication is provided that includes a transceiver, a memory configured to store instructions, and one or more processors communicatively coupled with the memory and the transceiver. The one or more processors are configured to receive, from a base station, a downlink communication indicating one or more dynamically scheduled CORESETs over which one or more repetitions of a downlink control channel are scheduled, receive, from the base station, the one or more repetitions of the downlink control channel over the one or more dynamically scheduled CORESETs, and combine the one or more repetitions of the downlink control channel to decode the downlink control channel.

In another specific example, an apparatus for wireless communication is provided that includes a transceiver, a memory configured to store instructions, and one or more processors communicatively coupled with the memory and the transceiver. The one or more processors are configured to transmit, to a UE, a downlink communication indicating one or more dynamically scheduled CORESETs over which one or more repetitions of a downlink control channel are scheduled, and transmit, to the UE, the one or more repetitions of the downlink control channel over the one or more dynamically scheduled CORESETs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
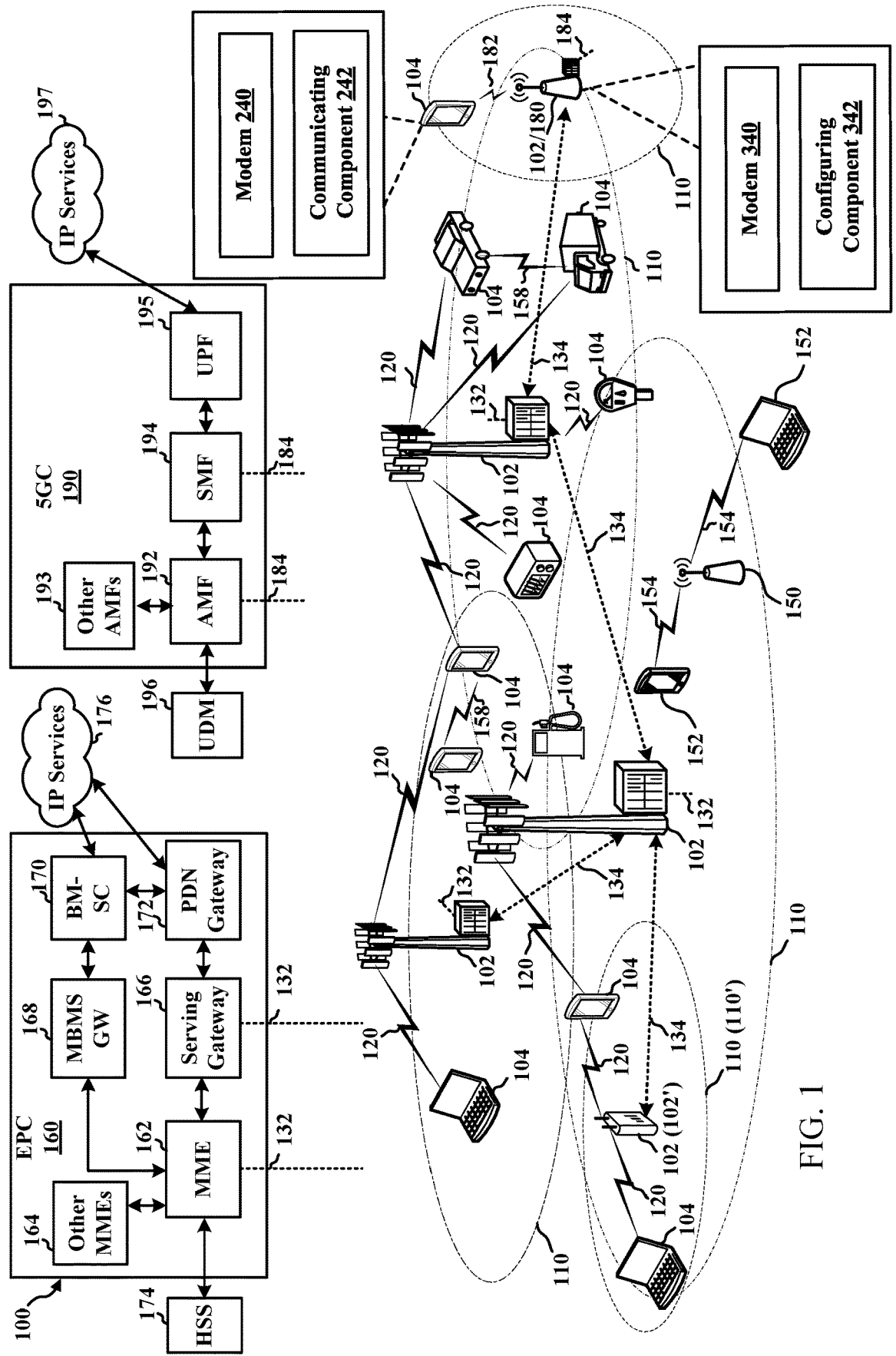
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to transmitting repetitions of control channel communications over multiple configured control resources to facilitate improved receiving of the control channel communications. In a specific example, repetitions of control channel communications, such as physical downlink control channel (PDCCH) communications, can be transmitted over multiple configured control resource sets (CORESETs) and/or related search spaces (SSs), such that a user equipment (UE) can attempt to receive one or more repetitions and combine the one or more repetitions for decoding the control channel communications.

In an example, in fifth generation (5G) new radio (NR), coverage recovery can be introduced to compensate for potential coverage reduction due to the device complexity reduction. In an example, to improve coverage, the base station (also referred to as a gNB in 5G) may schedule PDCCH with the same contents for combined decoding at UE. In addition, dynamic CORESETs can be configured where one PDCCH indicates dynamic CORESETs that indicate other search spaces for the UE to search (e.g., occurring at a later point in time), where the dynamic CORESET may indicate resources outside of a regular searching location defined for PDCCHs. In this regard, for example, dynamic CORESETs can add more opportunity for receiving downlink signaling between sparsely configured search spaces. In one example, multiple search space sets for PDCCH repetition can be linked for regular CORESET and configuration, where linking can be done semi-statically (e.g., in radio resource control (RRC)). In another example, CORESET with two or more transmission configuration indication (TCI) states for multi-TCI state can be used for PDCCH multiplexing, which may include one or more of space division multiplexing (SDM), frequency division multiplexing (FDM), or time division multiplexing (TDM). In other examples, PDCCH candidate limits can be imposed for PDCCH repetition, or CORESET can be used with two or more TCI states. Aspects described herein relate to extending some examples to be dynamic, such to apply to dynamic CORESETs and/or dynamically configured regular CORESETs, for PDCCH repetitions. In some examples described herein, PDCCH repetition can be TDM, FDM, SDM, or a combination, can be across different occasions of the same search space set, can be across search space sets (e.g., SS aggregation), can use the same or different (across search spaces) PDCCH candidate index, control channel element (CCE) set, or aggregation level, etc.

According to aspects described herein, a base station can configure a UE to receive one or more repetitions of a control channel communication, such that the UE can monitor resources for receiving the one or more repetitions and can combine received signals (e.g., at a physical layer) in decoding the control channel. In an example, the base station can dynamically configure control resources for the UE to monitor to receive the one or more repetitions, and the UE can accordingly determine and monitor the control resources. For example, the base station can configure, for at least a portion of the one or more repetitions, a dynamic CORESET that is different from static CORESETs configured or indicated by RRC signaling. In another example, the base station can dynamically configure CORESETs, for at least a portion of the one or more repetitions, defined in RRC signaling. Configuring control resources for transmitting repetitions of the control channel in this regard can improve reliability of the control channel communications by allowing UEs to potentially receive and combine more than one transmission of the control channel communications. Combining multiple control channel transmissions may allow for improved recovery of the control channel when decoding.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for receiving one or more repetitions of control channel communications, in accordance with aspects described herein. In addition, some nodes may have a modem 340 and configuring component 342 for configuring a device for receiving one or more repetitions of control channel communications, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, configuring component 342 can configure a UE 104 to receive one or more repetitions of control channel communications. For example, configuring component 342 can indicate, to the UE 104, resources over which the one or more repetitions of the control channel communications are to be transmitted. Communicating component 242 can receive the indication of resources from the base station 102 and can accordingly receive the control channel communications, or monitor for control channel communications, or one or more repetitions thereof, from the base station 102 over the resources. In an example, configuring component 342 can indicate the resources or parameters from which the resources can be determined, which may include a number of repetitions, CORESET identifiers, search space set identifiers, TCI states, control channel candidate indices, aggregation levels, etc.

Figure 2:
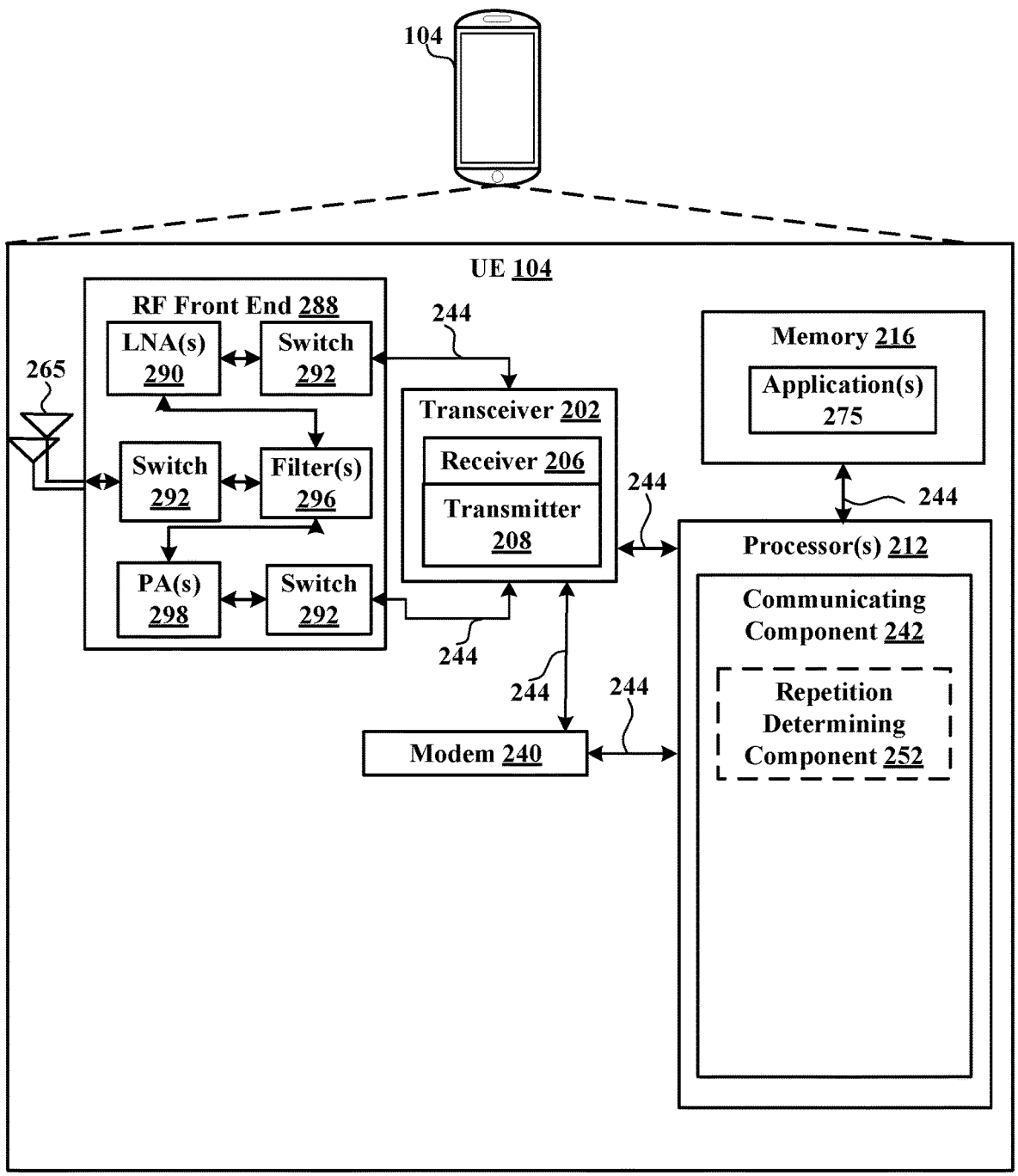
FIG. 2 is a block diagram illustrating an example of a UE, in accordance with various aspects of the present disclosure.
Figure 3:
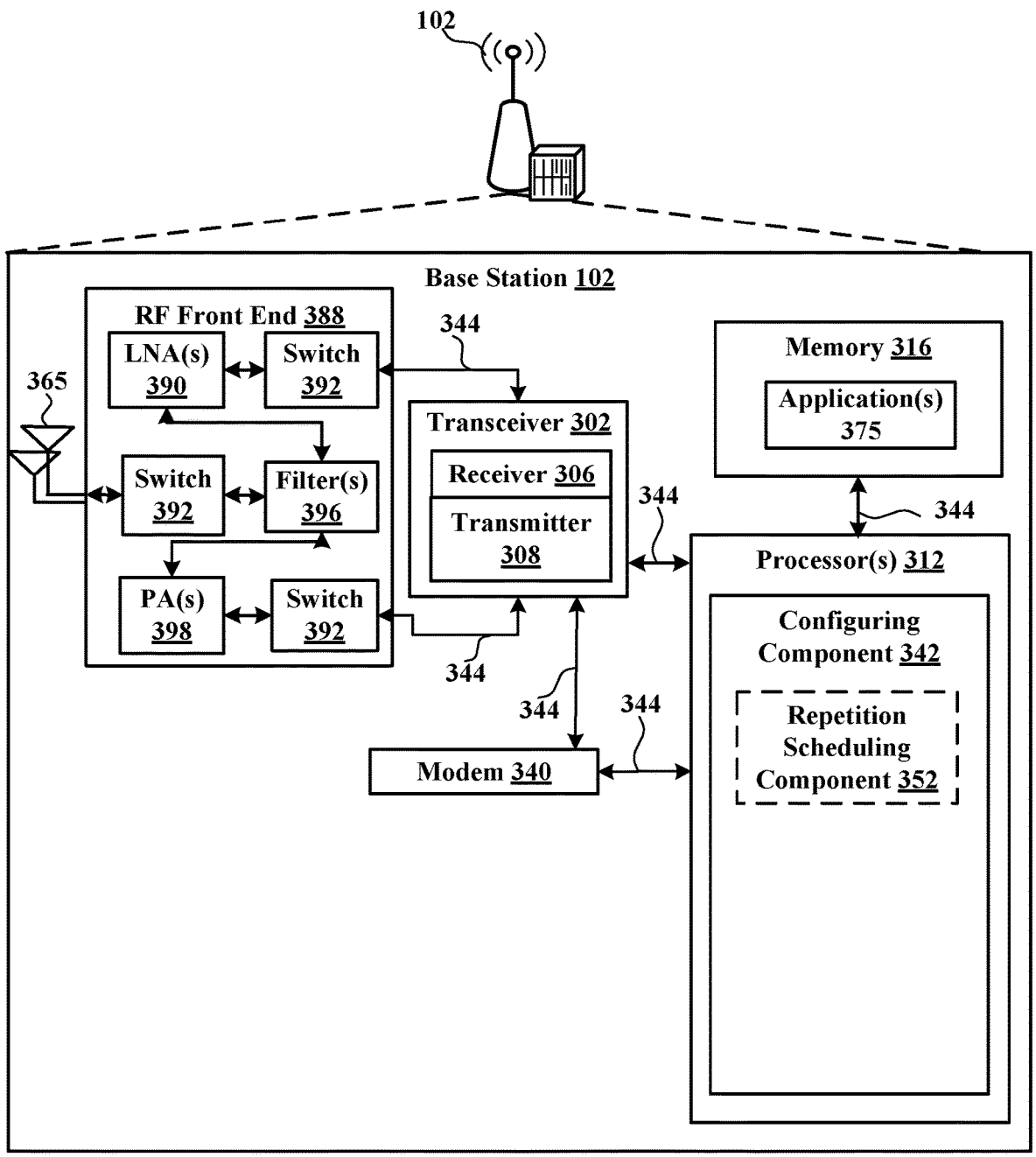
FIG. 3 is a block diagram illustrating an example of a base station, in accordance with various aspects of the present disclosure.
Figure 4:
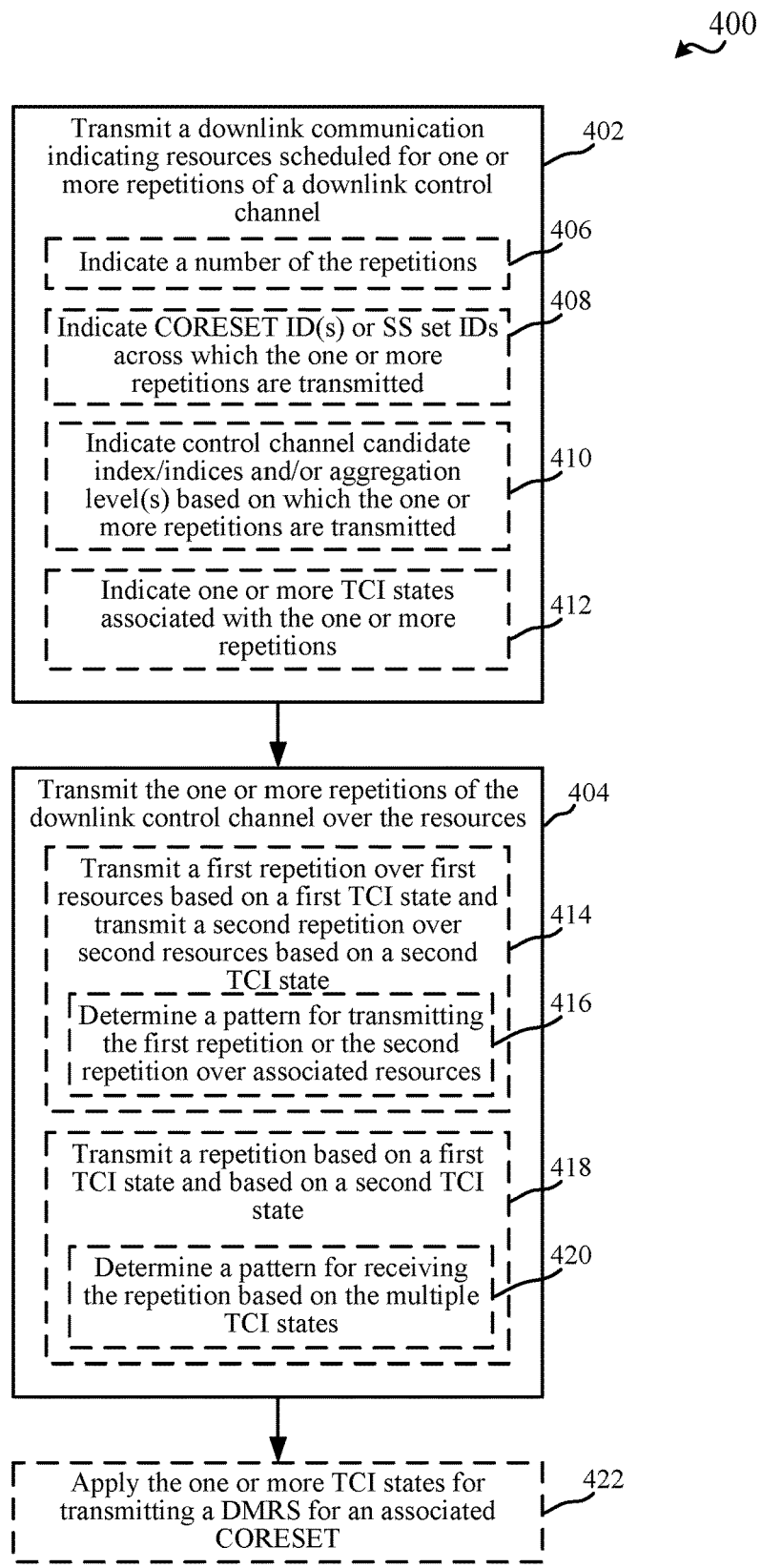
FIG. 4 is a flow chart illustrating an example of a method for configuring transmission of one or more repetitions of control channel communications, in accordance with various aspects of the present disclosure.
Figure 5:
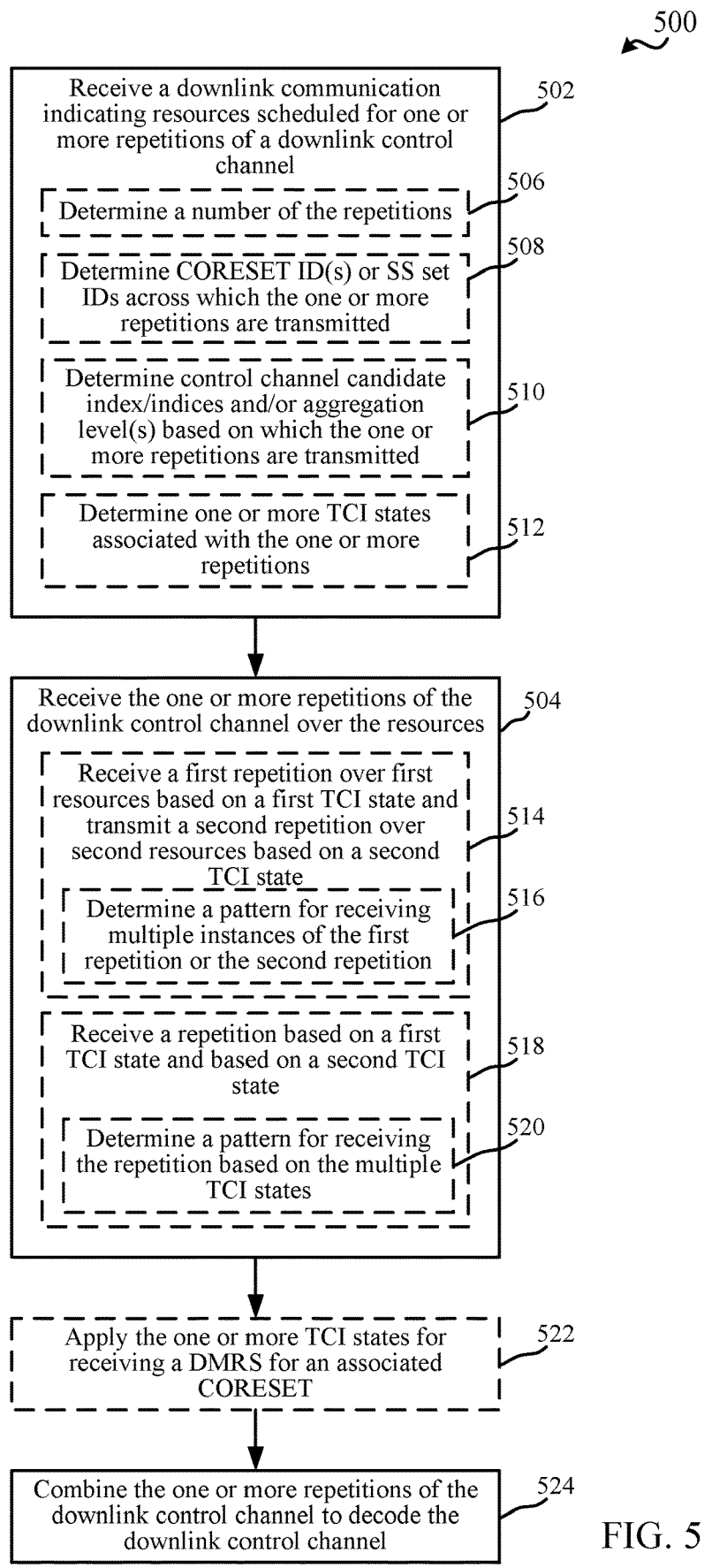
FIG. 5 is a flow chart illustrating an example of a method for receiving one or more repetitions of control channel communications, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for receiving one or more repetitions of control channel communications, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a repetition determining component 252 for determining resources related to receiving, or monitoring for, one or more repetitions of control channel communications, in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device for receiving one or more repetitions of control channel communications, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a repetition scheduling component 352 for scheduling or otherwise indicating resources related to receiving, or monitoring for, one or more repetitions of control channel communications, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for configuring devices for receiving one or more repetitions of control channel communications, in accordance with aspects described herein. FIG. 5 illustrates a flow chart of an example of a method 500 for detecting and/or receiving one or more repetitions of control channel communications, in accordance with aspects described herein. In an example, a base station can perform the functions described in method 400 using one or more of the components described in FIGS. 1 and 3. In an example, a UE 104 can perform the functions described in method 500 using one or more of the components described in FIGS. 1 and 2. Methods 400 and 500 are described below in conjunction with one another to ease explanation of the associated functions and concepts. Methods 400 and 500 are not required to be performed in conjunction with one another, and indeed one device can be configured to perform method 400 without having a corresponding device that performs method 500 and vice versa, in at least one example.

In method 400, at Block 402, a downlink communication indicating resources scheduled for one or more repetitions of a downlink control channel can be transmitted. In an aspect, repetition scheduling component 352, e.g., in conjunction with processor(s) 312, memory 316, transceiver 302, configuring component 342, etc., can transmit the downlink communication indicating resources scheduled for one or more repetitions of the downlink control channel. For example, repetition scheduling component 352 can transmit the downlink communication in downlink control information (DCI), a media access control (MAC) control element (CE), etc. In an example, the DCI, MAC-CE, etc. can correspond to another downlink control channel or corresponding communication. In an example, repetition scheduling component 352 can transmit the downlink communication in regular control resources that are defined or scheduled in higher layer signaling (e.g., RRC signaling) and define one or more search spaces for monitoring to receive control channel communications in the regular control resources. Regular control resources, as referred to herein, can include control resources defined for a wireless communication technology, such as 5G NR, or control resources configured in RRC signaling. In an example, regular control resources can include control resources that are not otherwise dynamically indicated (e.g., in DCI, MAC-CE, etc.). Moreover, the control resources can include a CORESET, corresponding search spaces, etc. defined in RRC signaling by the base station 102. Also, the downlink communication can include one or more parameters for determining the one or more repetitions and/or corresponding resources of the downlink control channel (where the downlink control channel being repeated can be different from the control channel over which the one or more parameters are received), as described herein. In addition, in an example, the repetitions can be transmitted or scheduled for transmission without consideration of feedback for the (regular) control channel communications—e.g., the downlink communication indicating the one or more parameters—and/or before an opportunity defined for receiving feedback for the (regular) control channel communications.

In method 400, at Block 404, the one or more repetitions of the downlink control channel can be transmitted over the resources. In an aspect, configuring component 342, e.g., in conjunction with processor(s) 312, memory 316, transceiver 302, etc., can transmit the one or more repetitions of the downlink control channel over the resources. For example, configuring component 342 can transmit the one or more repetitions of the downlink control channel in resources defining one or more search spaces, different control resources, etc. (e.g., different CORESETs, which may each have different search space sets, etc.). Moreover, for example, the resources can be over different periods of time and/or frequency. In an example, in 5G NR, communication resources can be divided into portions of frequency (e.g., subcarriers, bandwidth parts (BWP) including multiple subcarriers, etc.) over time (e.g., symbols, such as orthogonal frequency division multiplexing (OFDM) symbols, single carrier frequency division multiplexing (SC-FDM) symbols, etc., slots of multiple symbols, etc.). The communication resources can further be referred to in resource blocks (RBs), where each resource block can include a portion of frequency over time (e.g., a collection of subcarriers over a symbol). In an example, the resources defining the one or more search spaces may be in the same or different portions of frequency over the same or different portions of time. An example is shown in FIG. 6.

Figure 6:
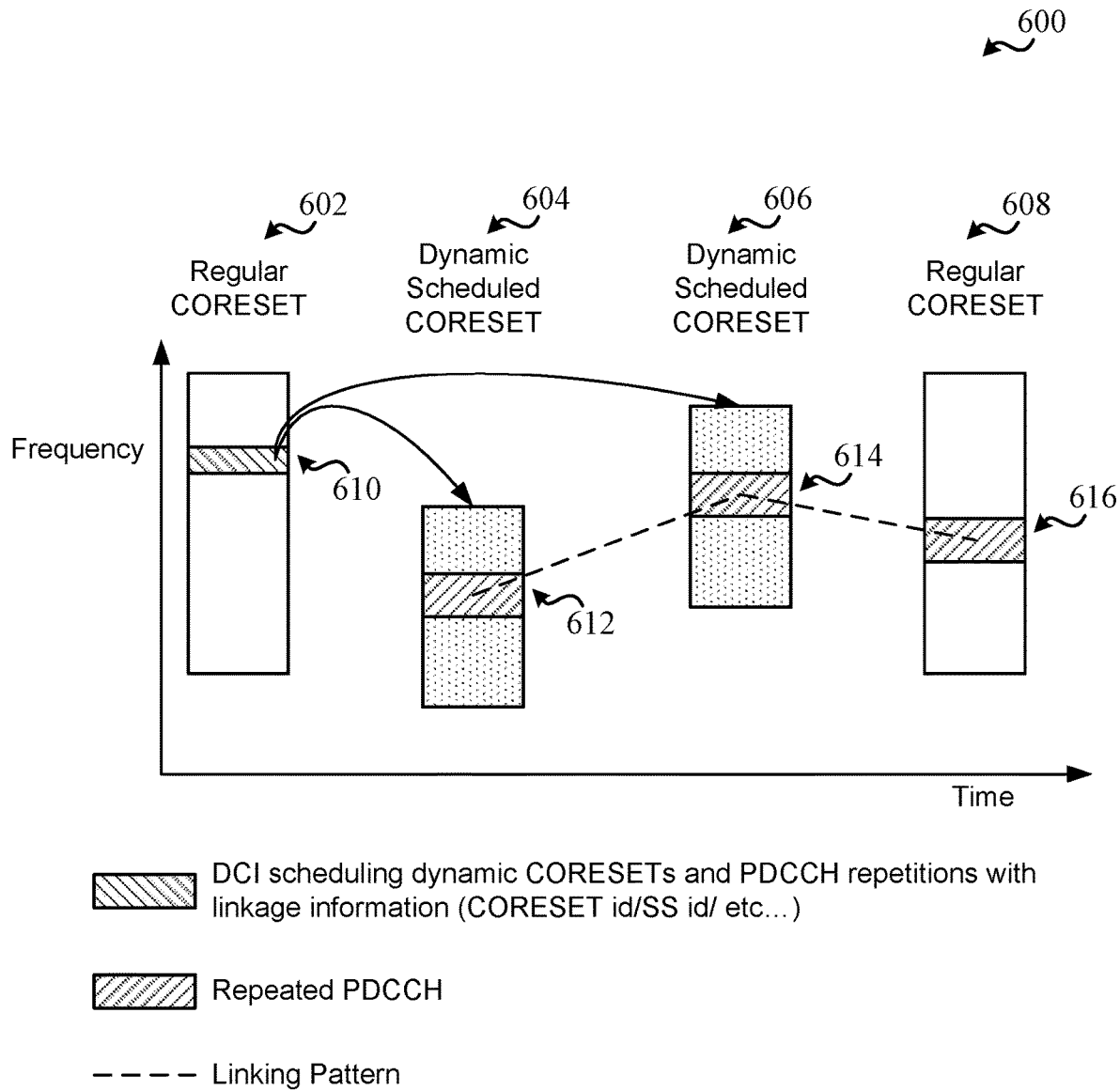
FIG. 6 illustrates an example of a resource allocation for communicating one or more repetitions of a control channel, in accordance with various aspects of the present disclosure.

FIG. 6 illustrates an example of a resource allocation 600 having multiple CORESETs 602, 604, 606, 608. In this example, resource allocation 600 can include a regular CORESET 602 that can be configured by RRC signaling from a base station. The base station can transmit DCI 610 within CORESET 602, where the DCI can schedule other dynamically scheduled CORESETs 604, 606, as explained further herein, and/or can schedule PDCCH repetitions with linkage information, which may include for example CORESET identifier (ID), SS set ID, etc. to assist in identifying resources or other information regarding the repetitions, as explained further herein, and/or the like. Resource allocation 600 can also include another regular CORESET 608 that can be configured by RRC signaling from a base station, which can include PDCCH 616.

In this example, dynamically scheduled CORESET 604 can include a repetition 612 of the PDCCH with DCI 610 (or another PDCCH, such as where the repetition 612 can be an initial transmission of the other PDCCH), and dynamically scheduled CORESET 606 can include a repetition 614 of the PDCCH (e.g., another repetition of PDCCH with DCI 610 or a repetition of the PDCCH transmitted in resources of CORESET 604). As described above and further herein, dynamically scheduled CORESETs 604, 606 can include dynamic CORESETs that are dynamically defined and indicated (e.g., by DCI or MAC-CE, etc. such as DCI 610 or other control information), and/or can include dynamically scheduled regular CORESETs (which can be defined in RRC signaling and indicated or otherwise activated by DCI or MAC-CE, etc.).

In any case, a UE can receive DCI scheduling 610 in the regular CORESET based on determining the regular CORESET 602 (or related search space set) resources from RRC signaling, and receiving/decoding the DCI. For example, UE can determine the DCI 610 includes information for the UE based on detecting the DCI in the search space corresponding to the regular CORESET 602 and based on an identifier assigned to the UE (e.g., a radio network temporary identifier (RNTI), which may be used to scramble the DCI or a related control channel). From this DCI, for example, the UE can determine the dynamically scheduled CORESETs 604 and 606, which can include the UE determining one or more explicit or implicit identifiers within the DCI that indicate resources or other information of CORESETs 604 and 606. The UE can monitor for, and/or receive, PDCCH repetitions 612, 614 in the CORESETs 604 and 606. The UE may also receive the PDCCH repetition 616 in the regular CORESET 608. The UE can combine the PDCCH repetitions (e.g., at a physical layer) in decoding the PDCCH to improve reliability thereof.

In method 500, at Block 502, a downlink communication indicating resources scheduled for one or more repetitions of a downlink control channel can be received. In an aspect, repetition determining component 252, e.g., in conjunction with processor(s) 212, memory 216, transceiver 202, communicating component 242, etc., can receive the downlink communication indicating resources scheduled for one or more repetitions of the downlink control channel. For example, repetition determining component 252 can receive the downlink communication in DCI, MAC-CE, etc., where the DCI, MAC-CE, etc. can correspond to another downlink control channel or corresponding communication, as described. In an example, repetition determining component 252 can receive the downlink communication in regular control resources that are defined or determined from higher layer signaling (e.g., RRC signaling) and define one or more search spaces for monitoring to receive control channel communications in the regular control resources. Moreover, the control resources can include a CORESET, corresponding search spaces, etc. defined in RRC signaling by the base station 102. Also, the downlink communication can include one or more parameters for determining the one or more repetitions and/or corresponding resources of the downlink control channel (where the downlink control channel being repeated can be different from the control channel over which the one or more parameters are received, as described herein.

In method 500, at Block 504, the one or more repetitions of the downlink control channel can be received over the resources. In an aspect, communicating component 242, e.g., in conjunction with processor(s) 212, memory 216, transceiver 202, etc., can receive the one or more repetitions of the downlink control channel over the resources. For example, communicating component 242 can monitor resources indicated in the downlink communication for detecting and receiving the one or more repetitions of the downlink control channel in the resources defining one or more search spaces, different control resources, etc. (e.g., different CORESETs, which may each have different search space sets, etc.). In an example, the resources defining the one or more search spaces may be in the same or different portions of frequency over the same or different portions of time, etc., as described.

In one example, in transmitting the downlink communication at Block 402, optionally at Block 406, a number of the repetitions can be indicated. In an aspect, repetition scheduling component 352, e.g., in conjunction with processor(s) 312, memory 316, transceiver 302, configuring component 342, etc., can indicate the number of the repetitions (e.g., in the downlink communication). For example, the downlink communication can indicate the number of repetitions being transmitted as a count of the number of repetitions (e.g., an integer number representative of the number of repetitions). In an example, the count may indicate an original transmission on which the repetitions are based and the number of repetitions of the original transmission or may indicate just the number of repetitions (e.g., and not the original transmission). In an example, referring to FIG. 6, the number of repetitions indicated may be two or three (depending on whether the original transmission is counted).

In one example, in receiving the downlink communication at Block 502, optionally at Block 506, a number of the repetitions can be determined. In an aspect, repetition determining component 252, e.g., in conjunction with processor(s) 212, memory 216, transceiver 202, communicating component 242, etc., can determine the number of repetitions (e.g., as indicated in the downlink communication). In an example, repetition determining component 252 can be configured with one or more parameters or instructions for determining resources for the one or more repetitions based at least in part on the number of repetitions (e.g., and/or on resources associated with receiving the downlink communication, etc.). For example, repetition determining component 252 can determine time and/or frequency resources for a first repetition as an offset (in time and/or frequency) from the downlink communication or from an original transmission of the control channel. In another example, repetition determining component 252 can determine time and/or frequency resources for a second repetition as an offset from the first repetition, etc. for the number of repetitions.

In one example, in transmitting the downlink communication at Block 402, optionally at Block 408, CORESET IDs or SS set IDs, across which the one or more repetitions are transmitted, can be indicated. In an aspect, repetition scheduling component 352, e.g., in conjunction with processor(s) 312, memory 316, transceiver 302, configuring component 342, etc., can indicate the CORESET IDs or SS set IDs across which the one or more repetitions are transmitted (or the CORESET IDs or SS IDs indicating, or associated with, time and/or frequency resources over which the one or more repetitions are transmitted). For example, the downlink communication can indicate the CORESET IDs or SS set IDs of a given CORESET to correspond to resources over which the UE is to monitor and/or detect/receive control channel repetitions. In an example, the UE can be configured with information mapping CORESET IDs and/or SS set IDs to certain time and/or frequency resources, and can accordingly determine, from the indicated IDs, the resources for receiving the one or more repetitions that are mapped to, or otherwise associated with, the indicated IDs.

For example, referring to FIG. 6, the downlink communication (e.g., DCI 610) can indicate CORESET IDs or SS set IDs corresponding to dynamically scheduled CORESETs 604, 606 (e.g., in the case that CORESETs 604, 606 are configured via RRC signaling and dynamically indicated via DCI). In another example, repetition scheduling component 352 can explicitly indicate resources related to a dynamic CORESET or search space in the downlink communication. As described, for example, CORESET/SS may be regular CORESET or dynamic CORESET or combination. In another example, as described, the same CORESET/SS IDs may be used; in this case, PDCCH can be repeated in multiple occasions of the same CORESET/SS.

In one example, in receiving the downlink communication at Block 502, optionally at Block 508, CORESET IDs or SS set IDs, across which the one or more repetitions are transmitted, can be determined. In an aspect, repetition determining component 252, e.g., in conjunction with processor(s) 212, memory 216, transceiver 202, communicating component 242, etc., can determine the CORESET IDs or SS set IDs across which the one or more repetitions are transmitted, and/or can determine the resources associated with the CORESET IDs or SS set IDs that can be monitored to receive the one or more repetitions. In an example, repetition determining component 252 can receive the CORESET IDs or SS set IDs indicated in the downlink communication, and can accordingly determine associated time and/or frequency resources for monitoring or otherwise detecting or receiving control channel repetitions in associated search spaces. In another example, where the downlink communication explicitly indicates resources related to a dynamic CORESET or search space, repetition determining component 252 can determine the resources and can accordingly monitor or detect/receive control channel communications over the resources.

In one example, other parameters related to the search space can be communicated in the downlink communication. For example, in transmitting the downlink communication at Block 402, optionally at Block 410, control channel candidate index/indices and/or aggregation level(s) (ALs), based on which the one or more repetitions are transmitted, can be indicated. In an aspect, repetition scheduling component 352, e.g., in conjunction with processor(s) 312, memory 316, transceiver 302, configuring component 342, etc., can indicate the control channel candidate index/indices and/or aggregation level(s) based on which the one or more repetitions are transmitted. For example, the downlink communication can indicate the control channel candidate index/indices and/or aggregation level(s) which the UE can use to determine the search space and/or whether the search space includes control channel communications for the UE. Accordingly, for example, the UE can decode signals over the search space (e.g., based on blind decoding using indicated hypotheses for the control channel index or indices and/or aggregation level(s) or otherwise) to obtain the control channel in the resources.

In one example, in receiving the downlink communication at Block 502, optionally at Block 510, control channel candidate index/indices and/or aggregation level(s), based on which the one or more repetitions are transmitted, can be determined. In an aspect, repetition determining component 252, e.g., in conjunction with processor(s) 212, memory 216, transceiver 202, communicating component 242, etc., can determine the control channel candidate index/indices and/or aggregation level(s) based on which the one or more repetitions are transmitted and can determine associated resources or other parameters for decoding received signals over the resources. In one example, the UE 104 can perform decoding of signals received in the search space (e.g., blind decoding), based on hypotheses for the control channel index/indices and/or aggregation level(s) as indicated in the downlink communication, to obtain the one or more repetitions. In an example, repetition determining component 252 can perform the blind decoding by attempting to decode the downlink communication using each combination of control channel index and aggregation level until the downlink communication is successfully decoded.

In one example, in transmitting the downlink communication at Block 402, optionally at Block 412, one or more TCI states, associated with the one or more repetitions are transmitted, can be indicated. In an aspect, repetition scheduling component 352, e.g., in conjunction with processor(s) 312, memory 316, transceiver 302, configuring component 342, etc., can indicate the one or more TCI states associated with the one or more repetitions. For example, the downlink communication can indicate the one or more TCI states for each repetition. In one example, the repetitions may be based on the same TCI state, in which case the downlink communication can indicate the single TCI state. For example, a TCI state can correspond to a reference signal and associated quasi-colocation (QCL) types, which can indicate a beam used for transmitting the repetition (e.g., using beamforming at the base station 102, as described). In an example, the base station 102 can configure multiple possible defined TCI states (e.g., based on indicating indices of configured TCI states), and repetition scheduling component 352 can identify one or more of the configured TCI states associated with the one or more repetitions (e.g., by indicating an index associated with the TCI state, etc.).

In one example, in receiving the downlink communication at Block 502, optionally at Block 512, one or more TCI states, associated with the one or more repetitions are transmitted, can be determined. In an aspect, repetition determining component 252, e.g., in conjunction with processor(s) 212, memory 216, transceiver 202, communicating component 242, etc., can determine the one or more TCI states associated with the one or more repetitions. For example, the one or more TCI states can be indicated by an identifier known or configured for the UE (e.g., in RRC signaling) and may be the same or different from TCI states configured for the UE in a system configuration from the base station 102. In any case, repetition determining component 252 can determine, based on the one or more indicated TCI states, the beam, QCL type, etc. used for transmitting the one or more repetitions. In an example, repetition determining component 252 can accordingly configure antennas or other receiving components for receiving the one or more repetitions.

In one specific example, repetition scheduling component 352 can indicate one or more of the above parameters in the downlink communication. For example, repetition scheduling component 352 can indicate for a first PDCCH repetition: CORESET 1/SS1/PDCCH candidate 1/AL4/TCI2, and for a second PDCCH repetition: CORESET 2/SS2/PDCCH candidate 1/AL8/TCI2. In any case, repetition determining component 252 can determine the parameters for the repetitions, can determine the corresponding resources (e.g., resources corresponding to CORESET 1/SS1/PDCCH candidate 1/AL4/TCI2, and CORESET 2/SS2/PDCCH candidate 1/AL8/TCI2), and communicating component 242 can monitor the resources for control channel communications received from the base station 102. In an example, base station 102 can have configured the resources corresponding to the various CORESETs/SS sets, etc. (e.g., in RRC configuration), and UE 104 can determine the resources to monitor based at least in part on the configuration from the base station 102 and the indication received by repetition determining component 252.

In one example, in transmitting the one or more repetitions at Block 404 where multiple TCI states are indicated, optionally at Block 414, a first repetition can be transmitted over first resources based on a first TCI state and a second repetition can be transmitted over second resources based on a second TCI state. In an aspect, configuring component 342, e.g., in conjunction with processor(s) 312, memory 316, transceiver 302, etc., can transmit the first repetition over the first resources based on the first TCI state and can transmit the second repetition over the second resources based on the second TCI state. For example, the downlink communication can indicate different control channel resources or candidate indices for multiple repetitions, along with multiple TCI states. In an example, configuring component 342 can transmit (which can include configuring antennas or other transmission components to transmit) one repetition based on one of the control channel resources or candidate indices and based on one of the TCI states, and can transmit another repetition based on another of the control channel resources or candidate indices and based on another of the TCI states. In this example, configuring component 342 can transmit per PDCCH of each TCI state independently (e.g., repeat PDCCH belonging to certain TCI only across the TCI). For example, PDCCH1 is repeated across TCI1 and PDCCH2 is repeated across TCI2. For example, in transmitting a repetition based on a TCI state, configuring component 342 can beamform antenna resources to transmit the repetition using a beam that is associated with the TCI state.

In one example, in receiving the one or more repetitions at Block 504, optionally at Block 514, a first repetition can be received over first resources based on a first TCI state and a second repetition can be received over second resources based on a second TCI state. In an aspect, communicating component 242, e.g., in conjunction with processor(s) 212, memory 216, transceiver 202, etc., can receive the first repetition over the first resources based on the first TCI state and can receive the second repetition over the second resources based on the second TCI state. As described, for example, the downlink communication can indicate the control resources and associated TCI states, and communicating component 242 can accordingly receive (and configure antennas or other receiving components to receive) the repetitions based on indicated TCI states over associated resources. For example, in receiving a repetition based on a TCI state, communicating component 242 can beamform antenna resources to receive the repetition using a beam that is associated with the TCI state.

In one example, in transmitting the first and second repetitions at Block 414, optionally at Block 416, a pattern for transmitting the multiple instances of the first repetition or the second repetition can be determined. In an aspect, configuring component 342, e.g., in conjunction with processor(s) 312, memory 316, transceiver 302, etc., can determine the pattern for transmitting multiple instances of the first repetition or the second repetition. For example, configuring component 342 can determine the pattern of which repetition or corresponding control resources are to use which TCI state (e.g., in a given time period or transmission). In an example, configuring component 342 can transmit an indication of the pattern to the UE 104 and can transmit the first and second repetitions based on the pattern.

In one example, in receiving the first and second repetitions at Block 514, optionally at Block 516, a pattern for receiving the multiple instances of the first repetition or the second repetition can be determined. In an aspect, communicating component 242, e.g., in conjunction with processor(s) 212, memory 216, transceiver 202, etc., can determine the pattern for receiving multiple instances of the first repetition or the second repetition. As described, for example, communicating component 242 can determine the pattern from an indication received from the base station 102 specifying the pattern and/or from one or more parameters for determining the pattern. Communicating component 242 can accordingly receive the first and second repetitions based on the pattern.

In one example, in transmitting the one or more repetitions at Block 404 where multiple TCI states are indicated, optionally at Block 418, a repetition can be received based on a first TCI state and based on a second TCI state. In an aspect, configuring component 342, e.g., in conjunction with processor(s) 312, memory 316, transceiver 302, etc., can transmit the repetition based on the first TCI state and based on the second TCI state. For example, the downlink communication can indicate multiple TCI states, and can transmit (and/or configure antennas or other transmission components to transmit) the repetition based on each of the TCI states. In this example, configuring component 342 can transmit repetitions across TCI states. For example, PDCCH1 can be repeated across TCI1 and TCI2.

In one example, in receiving the one or more repetitions at Block 504, optionally at Block 518, a repetition can be received based on a first TCI state and based on a second TCI state. In an aspect, communicating component 242, e.g., in conjunction with processor(s) 212, memory 216, transceiver 202, etc., can receive the repetition based on the first TCI state and based on the second TCI state. As described, for example, the downlink communication can indicate the control resources and associated TCI states, and communicating component 242 can accordingly receive (and/or configure antennas or other receiving components to receive) a repetition based on indicated TCI states over associated resources.

In one example, in transmitting the repetition at Block 418, optionally at Block 420, a pattern for transmitting the repetition based on the multiple TCI states can be determined. In an aspect, configuring component 342, e.g., in conjunction with processor(s) 312, memory 316, transceiver 302, etc., can determine the pattern for transmitting the repetition based on the multiple TCI states. For example, configuring component 342 can determine the pattern of which repetition or corresponding control resources are to use the multiple TCI states (e.g., in a given time period or transmission). In an example, configuring component 342 can transmit an indication of the pattern to the UE 104 and can transmit the repetition based on the pattern.

In one example, in receiving the first and second repetitions at Block 518, optionally at Block 520, a pattern for receiving the repetition based on the multiple TCI states can be determined. In an aspect, communicating component 242, e.g., in conjunction with processor(s) 212, memory 216, transceiver 202, etc., can determine the pattern for receiving the repetition based on the multiple TCI states. As described, for example, communicating component 242 can determine the pattern from an indication received from the base station 102 specifying the pattern and/or from one or more parameters for determining the pattern. Communicating component 242 can accordingly receive the repetition based on the pattern.

In yet another example, configuring component 342 can configure the UE with an indication of whether to receive the PDCCH of each TCI state independently or whether to receive across TCI states, as described above. The configuration can occur via the downlink communication, higher layer signaling (e.g., RRC signaling), etc., and/or may be based on capability indicated by the UE 104, etc. Communicating component 242, in this example, can receive the indication and can accordingly determine resources over which to receive the PDCCH.

In one example, in method 400, optionally at Block 422, the one or more TCI states can be applied for transmitting a demodulation reference signal (DMRS) for an associated CORESET. In an aspect, configuring component 342, e.g., in conjunction with processor(s) 312, memory 316, transceiver 302, etc., can apply the one or more TCI states for transmitting a DMRS for an associated CORESET, and can transmit the DMRS for the UE based on the TCI state. For example, configuring component 342 can configure antennas, transmission components, etc. for transmitting the DMRS according to the TCI state (e.g., based on QCL type, beam, etc. associated with the TCI state) for each indicated TCI state and/or associated repetition. In an example, this can include applying a beamforming matrix to the antennas to achieve a beam of the TCI state, where the beam can provide a spatial direction for transmitting the repetition. Moreover, for example, configuring component 342 can apply the TCI state (or determine which TCI state of multiple TCI states to apply) based on determining that the PDCCH repetitions were provided in the DCI or MAC-CE message. In another example, configuring component 342 can apply the TCI state (or determine which TCI state of multiple TCI states to apply) based on determining that the TCI states are applied for PDCCH DMRS for the corresponding CORESET, in case the resources of the corresponding CORESET are greater than (or equal to) a defined time duration (e.g., a threshold time duration, such as timeDurationFromQCL) away from the DCI or MAC-CE, etc.

In one example, in method 500, optionally at Block 522, the one or more TCI states can be applied for receiving a DMRS for an associated CORESET. In an aspect, communicating component 242, e.g., in conjunction with processor(s) 212, memory 216, transceiver 202, etc., can apply the one or more TCI states for receiving a DMRS for an associated CORESET, and can receive the DMRS (e.g., from the base station) based on the TCI state. For example, communicating component 242 can configure antennas, receiving components, etc. for receiving the DMRS according to the TCI state (e.g., based on QCL type, beam, etc. associated with the TCI state) for each indicated TCI state and/or associated repetition. In an example, this can include applying a beamforming matrix to the antennas to achieve a beam of the TCI state, where the beam can provide a spatial direction for receiving the repetition. Moreover, for example, communicating component 242 can apply the TCI state (or determine which TCI state of multiple TCI states to apply) based on determining that the PDCCH repetitions were provided in the DCI or MAC-CE message. In another example, configuring component 342 can apply the TCI state (or determine which TCI state of multiple TCI states to apply) based on determining that the TCI states are applied for PDCCH DMRS for the corresponding CORESET in case the resources of the corresponding CORESET are greater than (or equal to) a defined time duration (e.g., timeDurationFromQCL) away from the DCI or MAC-CE, etc.

In another example, e.g., in case the TCI states of the PDCCH repetitions were not provided in the DCI or MAC-CE message or the resources of the corresponding CORESET are less than a defined time duration (e.g., timeDurationFromQCL) away from the DCI or MAC-CE, each PDCCH repetition can use the TCI state based on normal TCI/QCL rules for the regular or dynamic CORESETs (e.g., as defined in 5G NR).

In one example, in method 500, at Block 524, the one or more repetitions of the downlink control channel can be combined to decode the downlink control channel. In an aspect, communicating component 242, e.g., in conjunction with processor(s) 212, memory 216, transceiver 202, etc., can, as part of a decoder or decoding process, combine the one or more repetitions of the downlink control channel (e.g., using signal combining techniques) to decode the downlink control channel. For example, communicating component 242 can combine the one or more repetitions of the downlink control channel using signal combining at the physical layer to generate a single combined signal, which can be decoded. This can improve the reliability of receiving the downlink control channel. In addition, as described, communicating component 242 can receive and combine the one or more repetitions, where the one or more repetitions may or may not include an initial transmission of the downlink control channel.

Figure 7:
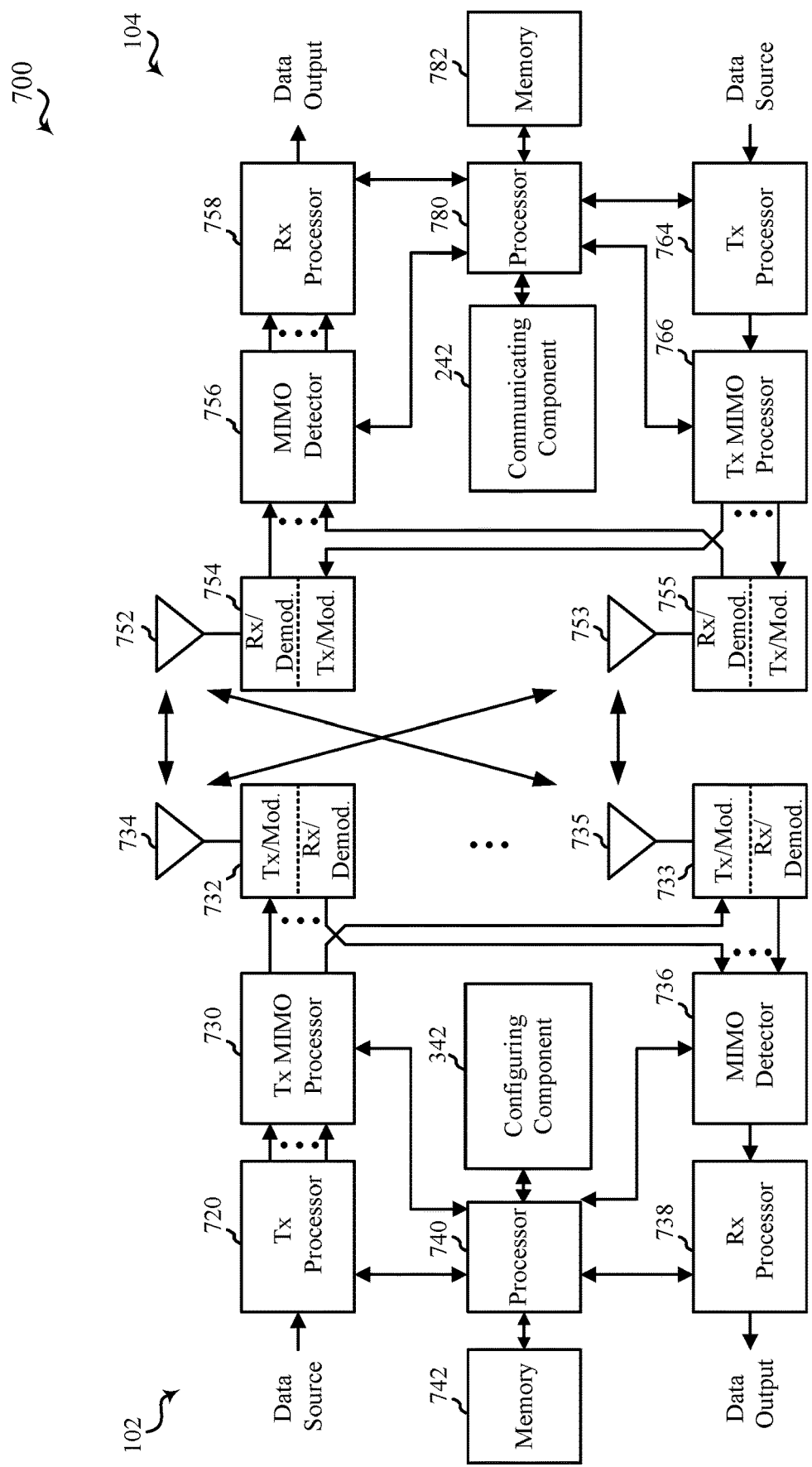
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other implementations or teaching described herein, without limitation.

Aspect 1 is a method for wireless communication including receiving, from a base station, a downlink communication indicating resources scheduled for one or more repetitions of a downlink control channel, receiving, from the base station, the one or more repetitions of the downlink control channel, and combining the one or more repetitions of the downlink control channel to decode the downlink control channel.

In Aspect 2, the method of Aspect 1 includes where the downlink communication includes one of a DCI or a MAC-CE.

In Aspect 3, the method of any of Aspects 1 or 2 includes where the downlink communication indicates a number of repetitions in the one or more repetitions of the downlink control channel, where receiving the one or more repetitions of the downlink control channel is based on the number of repetitions.

In Aspect 4, the method of any of Aspects 1 to 3 includes where the downlink communication indicates one or more CORESET identifiers or search space set identifiers across which the one or more repetitions of the downlink control channel are transmitted, where receiving the one or more repetitions of the downlink control channel includes determining resources for receiving the one or more repetitions of the downlink control channel based on the one or more CORESET identifiers or search space set identifiers.

In Aspect 5, the method of Aspect 4 includes where the one or more CORESET identifiers or search space set identifiers correspond to static CORESET identifiers or search space set identifiers, dynamic CORESET identifiers or search space set identifiers, or a combination thereof.

In Aspect 6, the method of Aspect 4 includes where the one or more CORESET identifiers or search space identifiers include a single CORESET identifier or search space set identifier for multiple ones of the one or more repetitions of the downlink control channel, where receiving at least the multiple ones of the one or more repetitions of the downlink control channel is based on the single CORESET identifier or search space set identifier.

In Aspect 7, the method of any of Aspects 1 to 6 includes where the downlink communication indicates multiple control channel candidate indices or aggregation levels based on which the one or more repetitions of the downlink control channel are transmitted, where receiving the one or more repetitions of the downlink control channel includes performing blind decoding for the one or more repetitions of the downlink control channel in resources associated with the multiple control channel candidate indices or based on the aggregation levels.

In Aspect 8, the method of any of Aspects 1 to 7 includes where the downlink communication indicates one or more TCI states associated with the one or more repetitions of the downlink control channel, where receiving the one or more repetitions of the downlink control channel is based on the one or more TCI states.

In Aspect 9, the method of Aspect 8 includes where the one or more TCI states include a single TCI state for multiple ones of the one or more repetitions of the downlink control channel, where receiving at least the multiple ones of the one or more repetitions of the downlink control channel is based on the single TCI state.

In Aspect 10, the method of Aspect 8 or 9 includes applying the one or more TCI states for receiving one or more DMRSs for an associated CORESET based at least in part on determining that the CORESET is at least a threshold time duration from the downlink communication.

In Aspect 11, the method of any of Aspects 1 to 10 includes where the downlink communication indicates multiple TCI states associated with the one or more repetitions of the downlink control channel, where receiving the one or more repetitions of the downlink control channel includes receiving a first repetition of the downlink control channel based on a first TCI state and receiving a second repetition of the downlink control channel based on a second TCI state.

In Aspect 12, the method of Aspect 11 includes determining to receive the first repetition and the second repetition based on a received configuration.

In Aspect 13, the method of any of Aspects 11 or 12 includes determining a pattern for receiving multiple instances of the first repetition based on the first TCI state or the second repetition based on the second TCI state based on a received configuration.

In Aspect 14, the method of any of Aspects 1 to 13 includes where the downlink communication indicates multiple TCI states associated with the one or more repetitions of the downlink control channel, where receiving the one or more repetitions of the downlink control channel includes receiving a repetition of the downlink control channel based on a first TCI state and based on a second TCI state.

In Aspect 15, the method of Aspect 14 includes determining to receive the repetition based on the first TCI state and the second TCI state based on a received configuration.

In Aspect 16, the method of any of Aspects 14 or 15 includes determining a pattern for receiving the repetition based on the first TCI state and the second TCI state based on a received configuration.

Aspect 17 is a method for wireless communication including transmitting, to a UE, a downlink communication indicating resources scheduled for one or more repetitions of a downlink control channel, and transmitting, to the UE, the one or more repetitions of the downlink control channel over the resources.

In Aspect 18, the method of Aspect 17 includes where the downlink communication includes one of a DCI or a MAC-CE.

In Aspect 19, the method of any of Aspects 17 or 18 includes where the downlink communication indicates a number of repetitions in the one or more repetitions of the downlink control channel, where transmitting the one or more repetitions of the downlink control channel is based on the number of repetitions.

In Aspect 20, the method of any of Aspects 17 to 19 includes where the downlink communication indicates one or more CORESET identifiers or search space set identifiers across which the one or more repetitions of the downlink control channel are transmitted, where transmitting the one or more repetitions of the downlink control channel includes determining resources for transmitting the one or more repetitions of the downlink control channel based on the one or more CORESET identifiers or search space set identifiers.

In Aspect 21, the method of Aspect 20 includes where the one or more CORESET identifiers or search space set identifiers correspond to static CORESET identifiers or search space set identifiers, dynamic CORESET identifiers or search space set identifiers, or a combination thereof.

In Aspect 22, the method of any of Aspects 20 or 21 includes where the one or more CORESET identifiers or search space identifiers include a single CORESET identifier or search space set identifier for multiple ones of the one or more repetitions of the downlink control channel, where transmitting at least the multiple ones of the one or more repetitions of the downlink control channel is based on the single CORESET identifier or search space set identifier.

In Aspect 23, the method of any of Aspects 17 to 22 includes where the downlink communication indicates multiple control channel candidate indices or aggregation levels based on which the one or more repetitions of the downlink control channel are transmitted, where transmitting the one or more repetitions of the downlink control channel includes performing blind decoding for the one or more repetitions of the downlink control channel in resources associated with the multiple control channel candidate indices or based on the aggregation levels.

In Aspect 24, the method of any of Aspects 17 to 23 includes where the downlink communication indicates one or more TCI states associated with the one or more repetitions of the downlink control channel, where transmitting the one or more repetitions of the downlink control channel is based on the one or more TCI states.

In Aspect 25, the method of Aspect 24 includes where the one or more TCI states include a single TCI state for multiple ones of the one or more repetitions of the downlink control channel, where transmitting at least the multiple ones of the one or more repetitions of the downlink control channel is based on the single TCI state.

In Aspect 26, the method of Aspect 25 includes applying the one or more TCI states for transmitting one or more DMRSs for an associated CORESET based at least in part on determining that the CORESET is at least a threshold time duration from the downlink communication.

In Aspect 27, the method of any of Aspects 17 to 26 includes where the downlink communication indicates multiple TCI states associated with the one or more repetitions of the downlink control channel, where transmitting the one or more repetitions of the downlink control channel includes transmitting a first repetition of the downlink control channel based on a first TCI state and transmitting a second repetition of the downlink control channel based on a second TCI state.

In Aspect 28, the method of Aspect 27 includes determining to transmit the first repetition and the second repetition based on a configuration provided to the UE.

In Aspect 29, the method of any of Aspects 27 or 28 includes determining a pattern for transmitting multiple instances of the first repetition based on the first TCI state or the second repetition based on the second TCI state based on a configuration provided to the UE.

In Aspect 30, the method of any of Aspects 17 to 29 includes where the downlink communication indicates multiple TCI states associated with the one or more repetitions of the downlink control channel, where transmitting the one or more repetitions of the downlink control channel includes transmitting a repetition of the downlink control channel based on a first TCI state and based on a second TCI state.

In Aspect 31, the method of Aspect 30 includes determining to transmit the repetition based on the first TCI state and the second TCI state based on a configuration provided to the UE.

In Aspect 32, the method of any of Aspects 30 or 31 includes determining a pattern for transmitting the repetition based on the first TCI state and the second TCI state based on a configuration provided to the UE.

Aspect 33 is an apparatus for wireless communication including a transceiver, a memory configured to store instructions, and one or more processors communicatively coupled with the memory and the transceiver, where the one or more processors are configured to perform one or more of the methods of any of Aspects 1 to 32.

Aspect 34 is an apparatus for wireless communication including means for performing one or more of the methods of any of Aspects 1 to 32.

Aspect 35 is a computer-readable medium including code executable by one or more processors for wireless communications, the code including code for performing one or more of the methods of any of Aspects 1 to 32.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a memory configured to store instructions; and
   one or more processors configured to execute the instructions and cause the apparatus to:
   obtain, from a base station, a downlink communication indicating one or more control resource sets (CORESETs) via which two or more repetitions of a downlink control channel are scheduled, wherein the downlink communication comprises one of a downlink control information (DCI) or a media access control (MAC) control element (CE);

obtain, from the base station, the two or more repetitions of the downlink control channel via the one or more CORESETs; and combine the two or more repetitions of the downlink control channel to decode the downlink control channel.

2. The apparatus of claim 1, wherein the downlink communication indicates a number of repetitions in the two or more repetitions of the downlink control channel, wherein the one or more processors are configured to obtain the two or more repetitions of the downlink control channel based on the number of repetitions.

3. The apparatus of claim 1, wherein the downlink communication indicates one or more CORESET identifiers of the one or more CORESETs or search space set identifiers across which the two or more repetitions of the downlink control channel are transmitted, wherein the one or more processors are configured to obtain the two or more repetitions of the downlink control channel via resources based on the one or more CORESET identifiers or the search space set identifiers.

4. The apparatus of claim 3, wherein the one or more CORESET identifiers correspond to static CORESET identifiers, the one or more search space identifiers correspond to static search space set identifiers, the one or more CORESET identifiers correspond to dynamic CORESET identifiers, the one or more search space identifiers correspond to dynamic search space set identifiers, or a combination thereof.

5. The apparatus of claim 3, wherein the one or more CORESET identifiers or the search space identifiers include a single CORESET identifier or a particular search space set identifier for multiple ones of the two or more repetitions of the downlink control channel, wherein the one or more processors are configured to obtain at least the multiple ones of the two or more repetitions of the downlink control channel based on the single CORESET identifier or the particular search space set identifier.

6. The apparatus of claim 1, wherein the downlink communication indicates multiple control channel candidate indices or aggregation levels based on which the two or more repetitions of the downlink control channel are transmitted, wherein the one or more processors are configured to obtain the two or more repetitions of the downlink control channel at least in part by performing blind decoding for the two or more repetitions of the downlink control channel in resources associated with the multiple control channel candidate indices or based on the aggregation levels.

7. The apparatus of claim 1, wherein the downlink communication indicates one or more transmission configuration indicator (TCI) states associated with the two or more repetitions of the downlink control channel, wherein the one or more processors are configured to obtain the two or more repetitions of the downlink control channel based on the one or more TCI states.

8. The apparatus of claim 7, wherein the one or more TCI states include a single TCI state for multiple ones of the two or more repetitions of the downlink control channel, wherein the one or more processors are configured to obtain at least the multiple ones of the two or more repetitions of the downlink control channel based on the single TCI state.

9. The apparatus of claim 7, wherein the one or more processors are further configured to apply the one or more TCI states for obtaining one or more demodulation reference signals (DMRS) for an associated control resource set (CORESET) based at least in part on the CORESET being at least a threshold time duration from the downlink communication.

10. The apparatus of claim 1, wherein the downlink communication indicates multiple transmission configuration indicator (TCI) states associated with the two or more repetitions of the downlink control channel, wherein the one or more processors are configured to obtain the two or more repetitions of the downlink control channel as a first repetition of the downlink control channel based on a first TCI state and a second repetition of the downlink control channel based on a second TCI state, the multiple TCI states including the first and second TCI states.

11. The apparatus of claim 10, wherein the one or more processors are further configured to obtain a configuration indicating one or more parameters, wherein the one or more processors are configured to obtain the first and second repetitions based on the configuration.

12. The apparatus of claim 10, wherein the one or more processors are further configured to obtain a configuration indicating one or more parameters, wherein the one or more processors are configured to obtain multiple instances of the first repetition based on the first TCI state or the second repetition based on the second TCI state and based on the configuration.

13. The apparatus of claim 1, wherein the downlink communication indicates multiple transmission configuration indicator (TCI) states associated with the two or more repetitions of the downlink control channel, wherein the one or more processors are configured to obtain the two or more repetitions of the downlink control channel as a repetition of the downlink control channel based on a first TCI state and based on a second TCI state.

14. The apparatus of claim 13, wherein the one or more processors are further configured to obtain a configuration indicating one or more parameters, wherein the one or more processors are configured to obtain the repetition based on the first TCI state and the second TCI state and based on the configuration.

15. The apparatus of claim 13, wherein the one or more processors are further configured to obtain a configuration indicating one or more parameters, wherein the one or more processors are configured to obtain, based on a pattern, the repetition based on the first TCI state and the second TCI state and based on the configuration.

16. An apparatus for wireless communication, comprising:

a memory configured to store instructions; and
one or more processors configured to execute the instructions and cause the apparatus to:
output, for transmission to a user equipment (UE), a downlink communication indicating one or more control resource sets (CORESETs) via which one or more repetitions of a downlink control channel are scheduled, wherein the downlink communication comprises one of a downlink control information (DCI) or a media access control (MAC) control element (CE); and
output for transmission, to the UE, the two or more repetitions of the downlink control channel via the one or more CORESETs.

17. The apparatus of claim 16, wherein the downlink communication indicates a number of repetitions in the two or more repetitions of the downlink control channel, wherein the one or more processors are configured to output for transmission the two or more repetitions of the downlink control channel based on the number of repetitions.

18. The apparatus of claim 16, wherein the downlink communication indicates one or more CORESET identifiers of the one or more CORESETs or search space set identifiers across which the two or more repetitions of the downlink control channel are transmitted, wherein the one or more processors are configured to output for transmission the two or more repetitions of the downlink control channel via resources for transmitting the two or more repetitions of the downlink control channel based on the one or more CORESET identifiers or the search space set identifiers.

19. The apparatus of claim 18, wherein the one or more CORESET identifiers correspond to static CORESET identifiers, the one or more search space identifiers correspond to static search space set identifiers, the one or more CORESET identifiers correspond to dynamic CORESET identifiers, the one or more search space identifiers correspond to dynamic search space set identifiers, or a combination thereof.

20. The apparatus of claim 18, wherein the one or more CORESET identifiers or the search space identifiers include a single CORESET identifier or a particular search space set identifier for multiple ones of the two or more repetitions of the downlink control channel, wherein the one or more processors are configured to output for transmission at least the multiple ones of the two or more repetitions of the downlink control channel based on the single CORESET identifier or the particular search space set identifier.

21. The apparatus of claim 16, wherein the downlink communication indicates multiple control channel candidate indices or aggregation levels based on which the two or more repetitions of the downlink control channel are transmitted.

22. The apparatus of claim 16, wherein the downlink communication indicates one or more transmission configuration indicator (TCI) states associated with the two or more repetitions of the downlink control channel, wherein the one or more processors are configured to output for transmission the two or more repetitions of the downlink control channel based on the one or more TCI states.

23. The apparatus of claim 22, wherein the one or more TCI states include a single TCI state for multiple ones of the two or more repetitions of the downlink control channel, includes a first TCI state and a second TCI state for a first repetition of the downlink control channel, or includes a first TCI state for a first repetition of the downlink control channel and a second TCI state for a second repetition of the downlink control channel.

24. The apparatus of claim 16, further comprising a transceiver that is configured to transmit at least one of the downlink communication or the two or more repetitions of the downlink control channel, wherein the apparatus is configured as a base station.

25. A method for wireless communication at a user equipment, comprising:
  obtaining, from a base station, a downlink communication indicating one or more control resource sets (CORESETs) via which two or more repetitions of a downlink control channel are scheduled, wherein the downlink communication comprises one of a downlink control information (DCI) or a media access control (MAC) control element (CE);
  obtaining, from the base station, the two or more repetitions of the downlink control channel via the one or more CORESETs; and
  combining the two or more repetitions of the downlink control channel to decode the downlink control channel.

26. The method of claim 25, wherein the downlink communication indicates a number of repetitions in the two or more repetitions of the downlink control channel, wherein receiving the two or more repetitions of the downlink control channel is based on the number of repetitions.

27. The method of claim 25, wherein the downlink communication indicates a number of repetitions in the two or more repetitions of the downlink control channel, wherein the two or more repetitions of the downlink control channel are obtained based on the number of repetitions.

28. A user equipment (UE) for wireless communication, comprising:
  a transceiver;
  a memory configured to store instructions; and
  one or more processors configured to execute the instructions and cause the UE to:
    receive, via the transceiver and from a base station, a downlink communication indicating one or more control resource sets (CORESETs) via which two or more repetitions of a downlink control channel are scheduled, wherein the downlink communication comprises one of a downlink control information (DCI) or a media access control (MAC) control element (CE);
    receive, via the transceiver and from the base station, the two or more repetitions of the downlink control channel via the one or more CORESETs; and
    combine the two or more repetitions of the downlink control channel to decode the downlink control channel.

29. The UE of claim 28, wherein the downlink communication indicates a number of repetitions in the two or more repetitions of the downlink control channel, wherein outputting for transmission the two or more repetitions of the downlink control channel is based on the number of repetitions.

30. The user equipment of claim 28, wherein the downlink communication indicates one or more CORESET identifiers of the one or more CORESETs or search space set identifiers across which the two or more repetitions of the downlink control channel are transmitted, wherein the one or more processors are configured to receive the two or more repetitions of the downlink control channel via resources based on the one or more CORESET identifiers or the search space set identifiers.

* * * * *